United States Patent
Brouwer et al.

(10) Patent No.: US 9,248,889 B2
(45) Date of Patent: Feb. 2, 2016

(54) STAND-UP PADDLE BOARD AND METHOD OF MANUFACTURE

(71) Applicants: Nathan Brouwer, Sparks, NV (US); Michael J. Okoniewski, Redondo Beach, CA (US)

(72) Inventors: Nathan Brouwer, Sparks, NV (US); Michael J. Okoniewski, Redondo Beach, CA (US)

(73) Assignees: Nathan Brouwer, Sparks, NV (US); Michael Okoniewski, Fairfax, CA (US)

( * ) Notice: Subject to any disclaimer, the term of this patent is extended or adjusted under 35 U.S.C. 154(b) by 111 days.

(21) Appl. No.: 13/865,108

(22) Filed: Apr. 17, 2013

(65) Prior Publication Data

US 2014/0315453 A1    Oct. 23, 2014

(51) Int. Cl.
*B63B 5/24* (2006.01)
*B63B 35/79* (2006.01)
*B29D 24/00* (2006.01)

(52) U.S. Cl.
CPC ............ *B63B 35/7906* (2013.01); *B29D 24/00* (2013.01); *B29D 24/007* (2013.01); *B63B 35/7909* (2013.01); *B63B 35/7916* (2013.01); *Y10T 156/10* (2015.01)

(58) Field of Classification Search
USPC ............... 441/65, 74; 114/343, 364, 361, 357
IPC ............ B63B 5/24,35/7906, 35/7909, 35/7915
See application file for complete search history.

(56) References Cited

U.S. PATENT DOCUMENTS

| | | | | |
|---|---|---|---|---|
| 5,266,249 A | * | 11/1993 | Grimes et al. ............... | 264/45.2 |
| 5,489,228 A | * | 2/1996 | Richardson et al. ............ | 441/74 |
| 5,807,152 A | * | 9/1998 | Wojcik .............................. | 441/74 |
| 6,800,006 B1 | * | 10/2004 | Itnyre et al. ..................... | 441/74 |
| 7,303,454 B2 | * | 12/2007 | Cheung .......................... | 441/74 |
| 2010/0242828 A1 | * | 9/2010 | Gratsch ......................... | 114/364 |

* cited by examiner

*Primary Examiner* — Stephen Avila
(74) *Attorney, Agent, or Firm* — Edwin Tarver; Lauson & Tarver LLP

(57) ABSTRACT

A stand-up paddle board is formed by a core surrounded by a skin. The core is manufactured by creating an upper core member mold and a lower core member mold, corresponding to the top and bottom of the core. The upper core member and lower core member includes a concave surface filled by a lattice-shaped matrix. The core members and the matrices are molded to be complimentary in shape, such that the surface of each matrix and the surrounding upper and lower core members adjoin each other and are connected by an adhesive to create an air-tight core having air-tight matrix chambers. The completed core is then surrounded by a conventional paddle board skin.

17 Claims, 4 Drawing Sheets

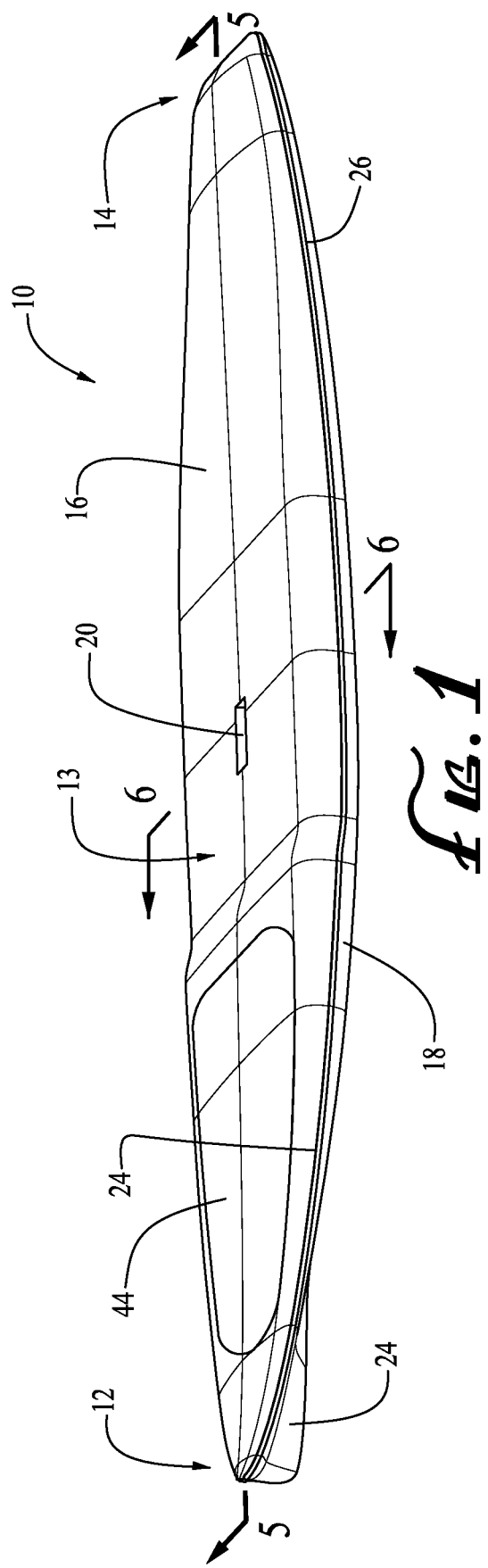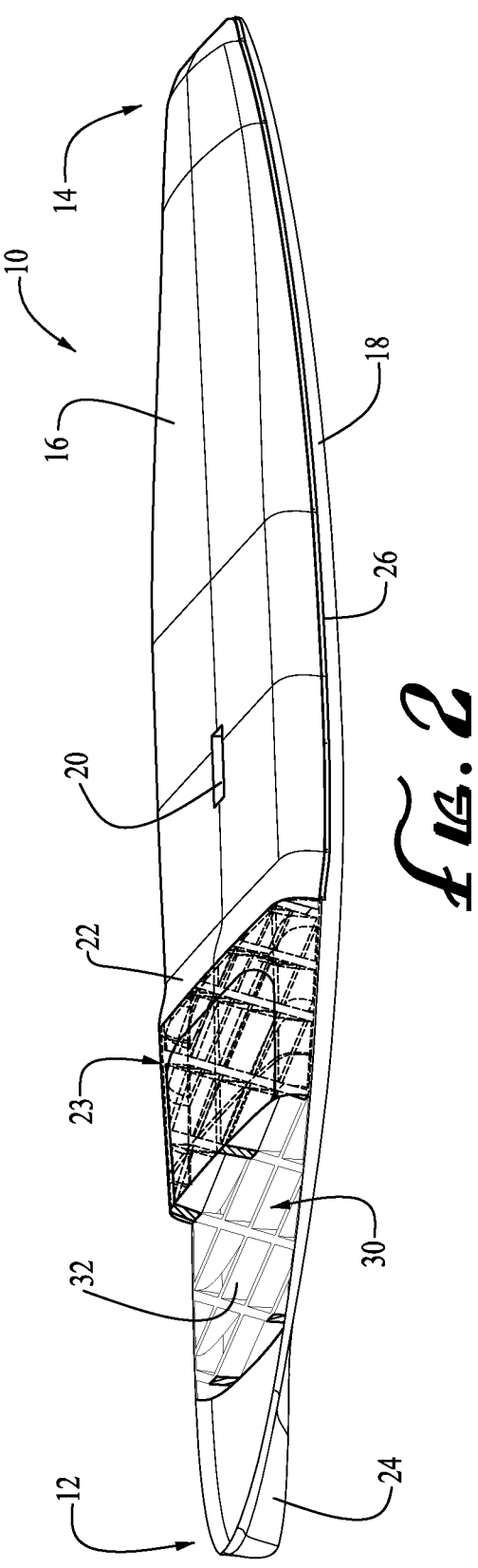

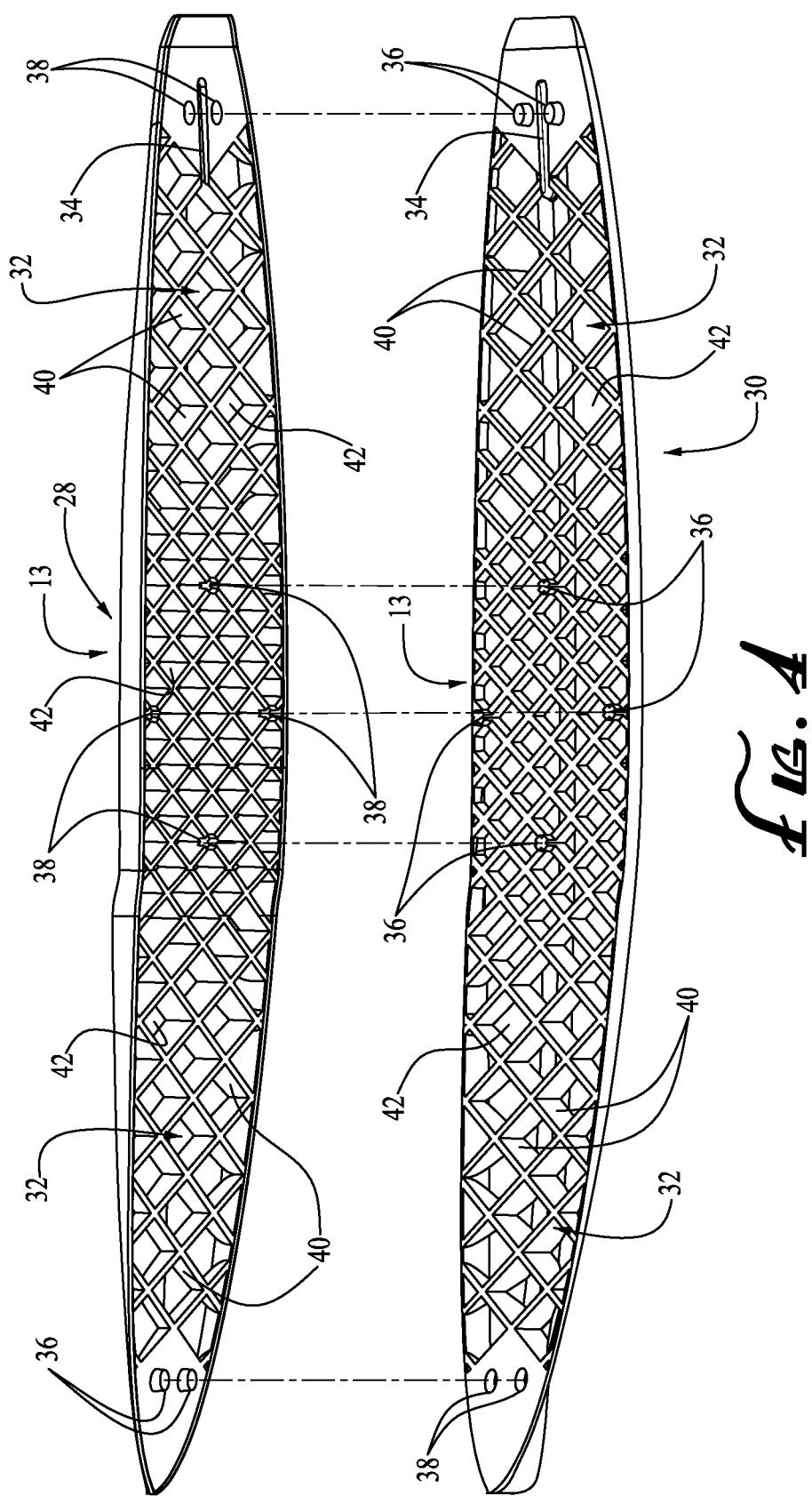

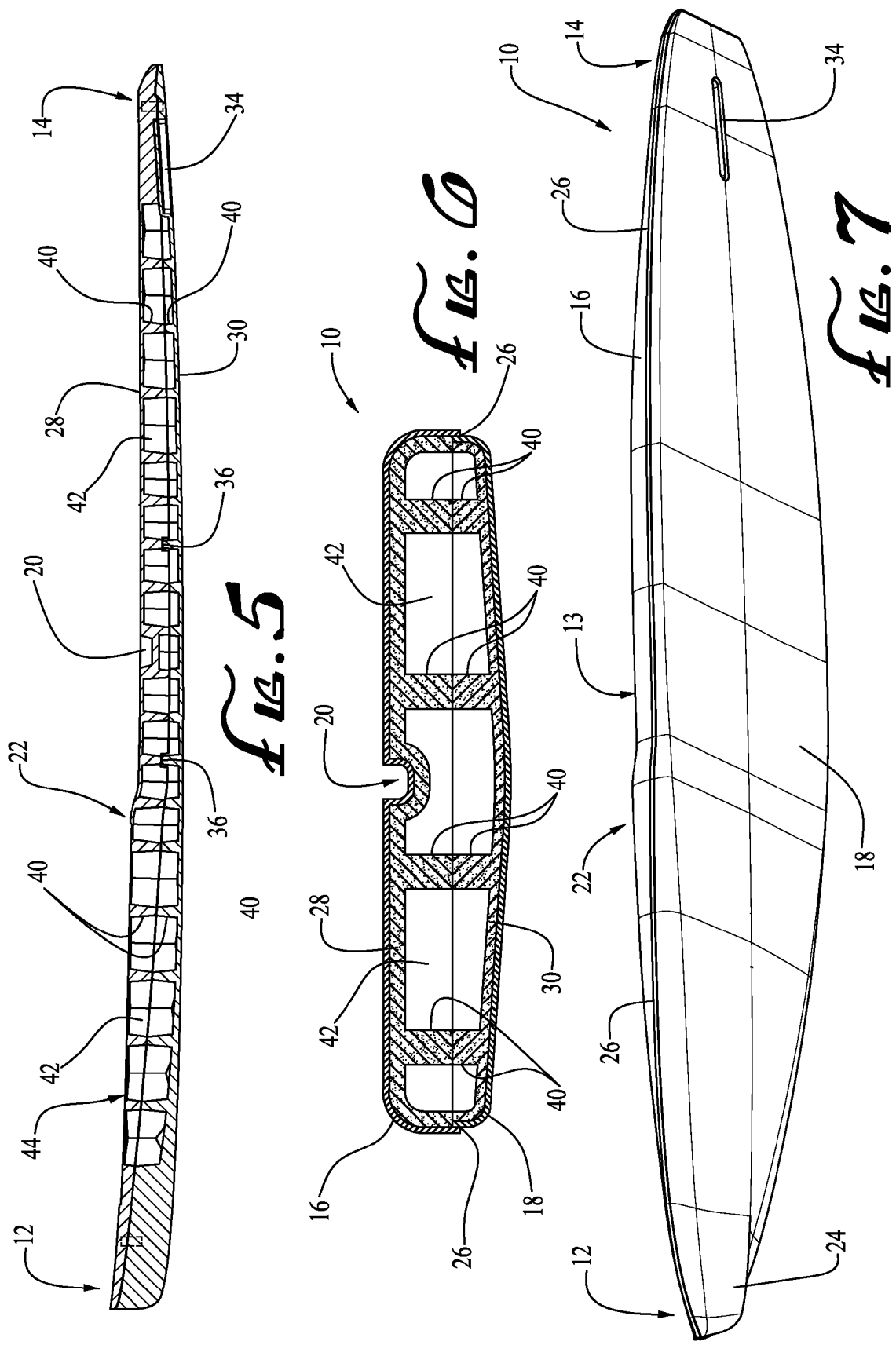

STAND-UP PADDLE BOARD AND METHOD OF MANUFACTURE

BACKGROUND

Stand-up paddle boards are known in the art. Presently, paddle boards are constructed by molding individual foam cores by hand, followed by applying a skin to the core, which prevents water intrusion and provides a smooth finish to the paddle board. Molding a board by hand involves shaping the arc of the sides of the board, planning the bottom of the board, and shaping any desired features into the top of the board. This process has several drawbacks. First, foam core paddle boards are prone to break under substantial torsion forces. Second, because they are made on an individual basis, no two are alike. Third, they tend to be expensive because they are made individually. And finally, the use of solid foam cores results in relatively heavy boards, which is also a disadvantage for smaller users with less strength.

Stand-up paddle boards have been developed to address the problem of breakage. For instance, Conner Jr. (U.S. Pat. App. No. 2011/0045720) discloses an aquatic gliding board having a honeycomb material for the core. The honeycomb material is oriented such that the longitudinal axes of the hexagonal cells are generally perpendicular to the deck portion of the skin. Chen (U.S. Pat. App. No. 2011/0023762) discloses a structure for a stand-up paddle board including a hardened layer between two low density layers. Metrot (U.S. Pat. App. No. 2008/0280096) discloses a paddle board having an outer envelope surrounding a foam core, in which the outer envelope defines a hollow inner space having spacers for stability.

While these boards to some extent may provide some additional stability, they fail to solve the problem of creating a strong resilient paddle board which may be quickly and inexpensively manufactured. It is therefore an object of the present invention to provide a light-weight stand-up paddle board designed with enhanced structural stability, and which may be manufactured in large quantities using standardized parts which are easily put together.

SUMMARY

An improved stand-up paddle board is characterized by a core surrounded by a skin. An upper core member and a lower core member form the top and bottom, respectively, of the paddle board core. The upper core member and the lower core member each have a concave cavity portion bearing a matrix. That is, the matrix is covered on one side. Preferably, each matrix is lattice-shaped in plan view, and may comprise a "waffle" pattern, generally. Also, the matrices are preferably adapted to have a greater density, i.e., more members comprising the matrix, in predetermined areas corresponding to common pressure points, such as at the tail, or where a user stands on the deck.

Both the core members and the matrices are complimentary, such that when the upper core member and lower core member are brought together, the faces of each matrix align. In this manner, the perimeter of the core members form an air-tight core, while the matrices form individual air-tight chambers within the core, including smaller air-tight chambers in areas of greater matrix density. Regardless of joint type, the core members and matrices are preferably sealed together with an adhesive to form an air-tight core.

Although the matrices are preferably arranged to abut each other, bound by an adhesive, the upper core member and lower core member may comprise a shoebox joint, or similar joint conducive to rapid alignment. In one alternative embodiment, a connecting member, such as an "H" extrusion may be employed to align the upper core member and lower core member. Additionally, the core members and matrices may have points of registration comprising raised or depressed areas to make assembling complimentary core members easier.

The upper core member and lower core member may be molded to include attachments for external features of the paddle board. In one preferred embodiment, recesses on the lower core member corresponding to the bottom of the paddle board are adapted for insertion of a fin, or plugs for drainage. In other embodiments, the core members may be molded to include a recessed handle, depressed areas for adhesive graphics, such as a recessed area near the nose end of the paddle board.

The core of the paddle board is surrounded by a skin, typical of conventional paddle boards. The skin is preferably made of ABS or a similar thermoplastic which is ¼ inches or less in thickness. The skin may be sealed around the board using a plasti-weld or similar technique for a smooth finish.

Although the structure of the stand-up paddle board is novel, many advantages in its design are due to the ease with which the design may be manufactured.

In order to mass produce stand-up paddle boards according to the design, two complimentary molds are made corresponding to the upper core member and lower core member. Initially a desired shape and matrix profile is created according to desired size, shape and strength characteristics. Once the molds are created, multiple upper core members and lower core members may be created. Since the core members preferably include registration points, in one embodiment, up to eight registration points, they may be quickly and easily assembled into complete cores.

One preferred material for the core members is foamed epoxy. Other materials may include EPS foam, co polymer, and polyurethane foam. Once molded, an adhesive may be applied to the surface of complimentary matrices and around the edges of each core member. Although the core members may simply abut each other, held in place by the registration points and epoxy, other joints may be used according to preference. In particular, an epoxied shoebox joint, or the casings epoxied into an "H" extrusion may enhance the strength and stability of the completed core.

Completed cores are surrounded by a thin film of ABS to provide a smooth finish for the paddle board. Preferably, the ABS, having a thickness of around 0.90 inches, is vacuum-formed according to the shape of the core. The ABS may also be applied as a single sheet which is folded over a completed core. In each embodiment, the additional features of a core, i.e., the fin attachment recess, recessed handle, deck plugs, and graphic display regions, etc. will also be vacuum-formed in the ABS skin.

BRIEF DESCRIPTION OF THE FIGURES

FIG. 1 is a perspective view of a stand-up paddle board according to the present invention.

FIG. 2 is a cut-away perspective view of a stand-up paddle board according to the present invention.

FIG. 4 is an exploded view of the matrices of an upper core member and a lower core member separated from each other.

FIG. 5 is a section view of an assembled core surrounded by a skin.

FIG. 6 is a section view of a recess adapted to receive a fin and a recessed handle.

FIG. 7 is a perspective bottom view of a stand-up paddle board.

REFERENCE NUMERALS

Figure 3:
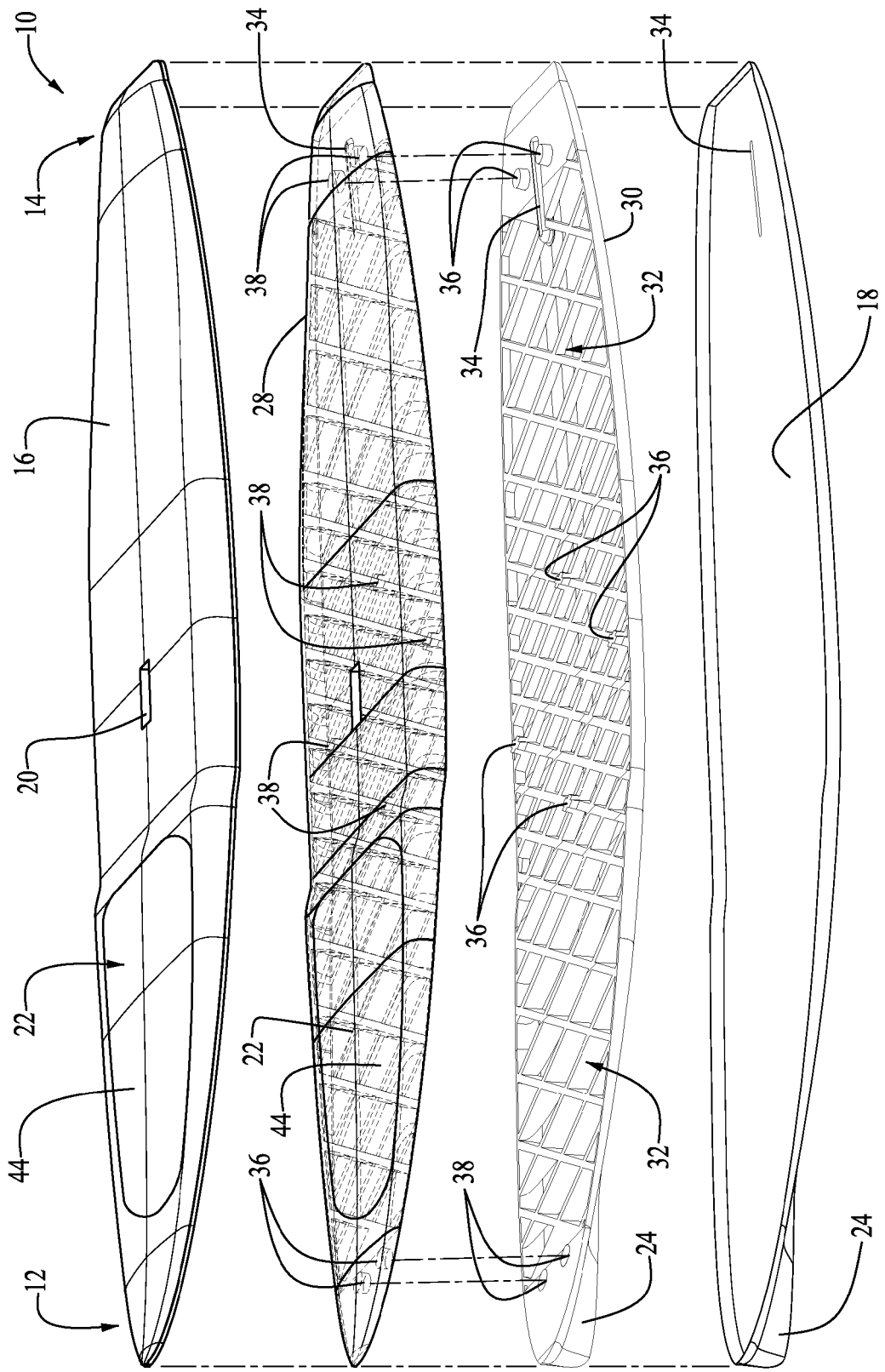
FIG. 3 is an exploded view of the upper skin, upper core member, lower core member, and lower skin prior to assembly.

10 Stand Up Paddleboard
12 Nose End
13 Middle Portion
14 Tail End
16 Upper Skin
18 Lower Skin
20 Handle
22 Raised Area
24 Stem
26 Seam
28 Upper Core Member
30 Lower Core Member
32 Matrix
34 Fin Slot
36 Registration Tabs
38 Registration Holes
40 Matrix Members
42 Matrix Chambers
44 Recessed Area

DESCRIPTION

Referring to FIG. 1, a stand-up paddle board 10 having a nose end 12 and a tail end 14, includes two skins, an upper skin 16 and a lower skin 18. Preferably, the paddle board 10 includes a handle 20 for carrying, and the handle 20, as is customary for large, stand-up paddle boards, is located near the middle portion 13. Additional features may include a raised area 22 at the front of the paddle board 10 and a stem 24 at the nose end 12 of the paddle board 10. Because the paddle board 10 comprises a distinct upper skin 16 and lower skin 18, it may also include a seam 26 at the junction of the upper skin 16 and lower skin 18, traveling around the edge of the paddle board 10.

Referring to FIG. 2, the paddle board 10 has an upper core member 28 under the upper skin 16, and a lower core member 30 under the lower skin 18. The upper core member 28 and lower core member 30 each comprise a matrix 32 that provides rigidity and strength, while also keeping the paddle board 10 light. Ideally, the upper core member 28 and lower core member 30 are made of foamed epoxy, using prefabricated molds. In this manner, multiple upper core members 28 and lower core members 30 may be easily and inexpensively made for mass production of the paddle board 10. On preferred material for the casings is foamed epoxy.

Referring to FIG. 3, an exploded view of the paddle board 10 is shown. As depicted in the figure, the handle 20, raised area 22, stem 24 and a fin slot 34 are all formed when molding the upper skin 16, lower skin 18, upper core member 28 and lower core member 30. By doing so, labor costs are reduced, as a paddle board 10 is finished upon adhesion of the components, without the need for making alterations to the paddle board 10 after initial manufacture. Also shown in FIG. 3, a recessed area 44 for adhesive graphics (not shown) is incorporated near the nose end 12 of the paddle board 10, which allows users to customize the board, or for branding.

Still referring to FIG. 3, registration tabs 36, and complimentary registration holes 38, are molded into the upper core member 28 and lower core member 30. By creating complimentary registration tabs 36 and registration holes 38 during molding, the upper core member 28 and lower core member 30 may be aligned and adhered together quickly and accurately. Although the illustrated embodiment shows alternating male and female registration tabs 36 at the nose end 12 and tail end 14 of the paddle board 10, any preferred configuration of registration tabs 36 allowing the upper core member 28 and lower core member 30 to be efficiently and accurately aligned may be used.

Referring to FIG. 4, the matrix 32 side of the upper core 28 and lower core 30 are shown. Also shown in this view are the matrix members 40 running diagonally throughout the upper core member 28 and lower core member 30. As shown in the figure, the distance between matrix members 40 may be reduced in certain areas in order to strengthen the paddle board in preferred areas. For instance, as the matrix members 40 approach the nose end 12 and tail end 14, respectively, of the paddle board, they are spaced farther apart as less rigidity is needed at the extreme ends of the board. Likewise, the matrix members 40 near the middle portion 13 of the paddle board 10 are spaced more densely to support the weight of a user. Preferably matrix members 40 between the upper core member 28 and lower core member 30 match up, so that when adhered together, individual air-tight matrix chambers 42 are formed. In this manner, if one of the matrix chambers 42 ruptures and fills with fluid, the remaining matrix chambers 42 remain empty.

Referring to FIGS. 5 and 6, cross sectional views of the paddle board 10 show the bilateral symmetry of the paddle board 10 and the upper core member 28 and lower core member 30, which come together such that the matrix members 40 abut each other when adhered. As shown in the figures, the handle member is molded into the exterior of the upper core member 28, and the fin slot is molded into the exterior of the lower core member 30. The upper skin 16 and lower skin 18 have complimentary molded portions designed to conform to the upper core member 28 and lower core member 30.

Referring to FIG. 7, a bottom perspective view of a completed paddle board 10 shows the upper skin 16, lower skin 18 and seam 26 between them. The lower skin 18 is generally flat across the bottom except for the stem 24, to help users guide the board when in use. Although the upper skin 16 is shown with the raised area 22, as shown in the other views of the paddle board 10, this is only one configuration and other raised areas may be molded, including areas specifically shaped to accommodate stickers and decals for branding. As shown, the fin slot 34 is empty, as the illustrated embodiment is designed for fin assembly upon delivery in order to ship paddle boards 10 in a more compact configuration.

The structure of the paddle board 10 having been shown and described, manufacture of the paddle board 10 will now be discussed.

In order to in expensively mass produce numerous paddle boards 10, a manufacturer will initially form a mold blank, including the shape of the upper core member 28, lower core member 30, matrix members 40, and matrix 32 pattern, among other features such as registration tabs 36. From the mold blank, molds are made for the upper core member 28 and lower core member 30. Using a desired material such as foaming epoxy, the manufacturer may easily create any number of upper core members 28 and lower core members 28.

After a desired quantity of upper core members 28 and lower core members 30 are made, a corresponding quantity of upper skins 16 and lower skins 18 may be made. Similar to the upper core member 28 and lower core member 30, molds are created, preferably for a vacuum-forming technique. In one embodiment thin film of ABS, such as quarter-inch ABS may be used, which provides a smooth finish for the paddle board 10. The vacuum-formed upper skin 16 and lower skin 18 are then adhered to the upper core member 28 and lower core member 30, respectively, and the seam between them burnished.

While the apparatus and method have been described in detail with reference to specific embodiments thereof, it will be apparent to one skilled in the art that various changes and modifications can be made therein without departing from the spirit and scope thereof. Thus, it is intended that the present description cover the modifications and variations of the apparatus and method provided they come within the scope of the appended claims and their equivalents.

What is claimed is:

1. A stand-up paddle board comprising:
    an upper core member having a first matrix covered on one side, and a lower core member having a second matrix covered on one side;
    wherein the upper core member and the lower core member are complimentary and when mated, form an core;
    wherein the first matrix and the second matrix have complimentary faces such that the first matrix and the second matrix align when the upper core and the lower core are brought together, forming a plurality of matrix chambers within the paddle board;
    wherein the matrix chambers at a nose end and at a tail end of the paddle board are larger than the matrix chambers at the middle portion of the paddle board; and
    a skin surrounding the core.

2. The paddle board of claim 1 wherein the upper core member and the lower core member further comprise points of registration for alignment.

3. The paddle board of claim 1 wherein the upper core member and the lower core member and the complimentary faces are connected by an adhesive.

4. The paddle board of claim 1 wherein the matrices are diamond lattice-shaped in plan view.

5. The paddle board of claim 1 wherein the matrices have a greater density at predetermined areas corresponding to pressure points on the paddle board.

6. The paddle board of claim 1 wherein the upper core member and lower core member form a shoebox joint when brought together.

7. The paddle board of claim 1 wherein the upper core member and lower core member are connected by an "H" extrusion connector.

8. The paddle board of claim 1 wherein the lower core member further comprises a recess for receiving a fin.

9. The paddle board of claim 1 wherein the upper core member core further comprises a recessed handle.

10. The paddle board of claim 1 wherein the skin is substantially 1.4 inches or less in thickness.

11. A stand-up paddle board comprising:
    an upper core member and a lower core member, each core member having a concave cavity bearing a lattice matrix;
    wherein the upper core member and lower core member are complimentary and adapted to form a single core when the matrices are brought together;
    wherein the matrices abut each other to form a plurality of chambers within the core;
    wherein the chambers at a middle portion of the board are smaller than the chambers at other portions of the board;
    wherein the upper core member and the lower core member further comprise complimentary points of registration for alignment at a nose end and at a tail end of the paddle board; and
    a skin substantially 1.4 or less in thickness surrounding the core.

12. A method of manufacturing a stand-up paddle board, comprising the steps of:
    forming a complimentary upper core member and a lower core member, each having a cavity;
    forming complimentary matrices in each cavity;
    forming registration points on the matrices of the upper core member and the lower core member at the nose end and at the tail end of the paddle board;
    aligning the registration points thereby aligning the upper core member and the lower core member;
    adhering together the upper core member and the lower core member; and
    joining the matrices in each cavity to form a matrix-bearing core; and surrounding the core with a skin.

13. The method of claim 12 further comprising the step of forming denser matrices at predetermined areas corresponding to pressure points on the paddle board.

14. The method of claim 12 further comprising the step of vacuum-forming the skin member around the core.

15. The method of claim 12 further comprising the step of forming fin attachment locations along a bottom surface of the core.

16. The method of claim 12 further comprising the step of forming a recessed handle and deck plugs in the core.

17. The method of claim 12 further comprising the step of forming a recessed area for graphics.

* * * * *